United States Patent [19]

Koshar

[11] 4,031,036

[45] June 21, 1977

[54] USE OF BIS(FLUOROALIPHATICSULFONYL) IMIDES IN CATIONIC POLYMERIZATION

[75] Inventor: Robert J. Koshar, Mahtomedi, Minn.

[73] Assignee: Minnesota Mining and Manufacturing Company, St. Paul, Minn.

[22] Filed: June 9, 1975

[21] Appl. No.: 585,101

[52] U.S. Cl. .................. 260/2 N; 260/2 A; 260/2 EN; 260/2 XA; 260/2 D; 260/47 A; 260/47 EN; 260/67 R; 260/67 FP; 260/78.3 R; 526/192; 526/220

[51] Int. Cl.² ............... C08F 4/00; C08G 2/06; C08G 59/68; C08G 65/10

[58] Field of Search .......... 260/2 A, 47 A, 2 N, 260/47 EN, 2 EC, 47 EC, 2 EN, 2 XA, 2 D, 67 FP, 67 R; 526/220, 192; 204/159.11

[56] References Cited

UNITED STATES PATENTS

| | | | |
|---|---|---|---|
| 3,347,676 | 10/1967 | Cripps | 96/115 |
| 3,586,616 | 6/1971 | Kropp | 204/159.11 |
| 3,632,843 | 1/1972 | Allen et al. | 260/2 EC |
| 3,842,019 | 10/1974 | Kropp | 260/2 EP |

*Primary Examiner*—Harold D. Anderson
*Assistant Examiner*—E. A. Nielsen
*Attorney, Agent, or Firm*—Cruzan Alexander; Donald M. Sell; William G. Ewert

[57] ABSTRACT

Bis(fluoroaliphaticsulfonyl)imides, in active or latent form, are used as catalysts for the polymerization of cationic sensitive monomers, e.g., epoxy resins.

22 Claims, No Drawings

USE OF BIS(FLUOROALIPHATICSULFONYL) IMIDES IN CATIONIC POLYMERIZATION

This invention relates to the curing of cationic sensitive monomers, such as epoxides, which can be used, for example, as adhesives, impregnants, potting resins, etc. In another aspect, it relates to a process for catalyzing the curing of such monomers with a new catalyst therefor, and to the cured products produced thereby. In another aspect, it relates to mixtures of such monomers and latent catalysts for the curing thereof. In a further aspect, it relates to the curing of such monomers with latent catalysts which are activated by heat or other means.

The utility of many acids or their anhydrides as catalysts in esterification or in polymerization of cationic sensitive monomers, such as epoxides, is well known. Esterification catalysts include sulfuric acid, boron trifluoride, hydrogen chloride, polyphosphoric acid, perchloric acid, p-toluenesulfonic acid and trifluoroacetic anhydride. Although some acid esterification catalysts, e.g., boron trifluoride, are also effective for polymerization of epoxides and other cationic sensitive monomers, not all are useful or practical for such polymerization. Because of the known complexity of epoxide polymerizations, acid strength alone, for example, is not determinative of the effectiveness of an acid catalyst for such polymerization.

While the curing of such cationic sensitive monomers as epoxy resins has been found to be advantageous in many cases with acid catalysts, the use of some acid catalysts is often objectionable, for example because of their corrosiveness, moisture sensitivity, or volatility or because they cannot be used to provide latent or room temperature curable resin compositions or because their use evolves toxic products. Recently, various bis(perfluoroalkylsulfonyl)methanes and fluoroalkanesulfonic acids, and salts thereof, have been proposed as catalysts for curing various cationic sensitive monomers without such objectionable features — see U.S. Pat. Nos. 3,632,843 (Allen et al), 3,586,616 (Kropp), 3,794,687 (Koshar), and 3,842,019 (Kropp).

Briefly, this invention provides bis)fluoroaliphaticsulfonyl)imides and salts thereof as a novel class of catalysts for the curing (or polymerization) of cationic sensitive monomers, for example epoxy resins. These catalysts, in their acid form, preferably have the general formula $(R_fSO_2)_2NH$ (I).

In said formula I, $R_f$ is a monovalent fluorinated saturated aliphatic radical containing at least one carbon atom. Where said radical contains a plurality of carbon atoms in a skeletal chain, such chain may be branched or cyclic but preferably is a straight chain. Said skeletal chain of carbon atoms can be interrupted by divalent hetero atoms or radicals, such as divalent oxygen or trivalent nitrogen atoms, each of which is bonded only to carbon atoms, but preferably where such hetero moieties are present, such skeletal chain does not contain more than one said hetero moiety for every two carbon atoms. An occasional carbon-bonded hydrogen atom, bromine atom, or chloride atom may be present; where present, however, they preferably are present not more than once for every two carbon atoms. Thus, the non-skeletal valence bonds are preferably carbon-to-fluorine bonds, that is, $R_f$ is preferably perfluorinated. The total number of carbon atoms in $R_f$ can vary and be, for example, 1 to 18, preferably 1 to 8. Where $R_f$ is or contains a cyclic structure, such structure preferably has 5 or 6 ring members, 1 or 2 of which can be said hetero atoms, e.g., oxygen and/or nitrogen. The radical, $R_f$, is also one which is free of ethylenic or other carbon-to-carbon unsaturation, that is, it is a saturated aliphatic, cycloaliphatic, or heterocyclic radical. Examples of $R_f$ radicals are fluorinated alkyl, e.g., $CF_3—$, and alkoxyalkyl, e.g., $CF_3OCH_2—$, said radicals being preferably perfluorinated straight-chain aliphatic radicals consisting only of carbon and fluorine atoms. The two $R_f$ radicals in formula I can be the same or different.

The above-described bis(fluoroaliphaticsulfonyl)imides — occasionally referred to hereinafter as disulfonyl imides for purposes of brevity — can be prepared from fluoroaliphaticsulfonyl fluorides, $R_fSO_2F$, by procedures described in "Chemiker-Zeitung", 96 (10) 582 (1972) and German Offenlegungsschrift 2,239,817 (1974) (the latter disclosing that the disulfonyl imides are useful as catalysts in esterification). Representative disulfonyl imides of formula I are $(CF_3SO_2)_2NH$, $CF_3SO_2NHSO_2C_4F_9$, $(C_4F_9SO_2)_2NH$, $CF_3SO_2NHSO_2C_8F_{17}$, $c—C_6F_{11}SO_2NHSO_2CF_3$, $c—C_6F_{11}CF_2CF_2SO_2NHSO_2CF_3$, $CF_3SO_2NHSO_2CF_2CF_2H$, $CF_3SO_2NHSO_2CF(CF_3)_2$, $C_4F_9SO_2NHSO_2C_8F_{17}$, $(C_8F_{17}SO_2)_2NH$, $CF_3SO_2NHSO_2(CF_2)_3Cl$, and

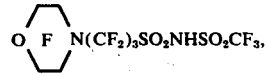

and mixtures thereof.

The disulfonyl imides are generally low melting solids, have high solubility in common polar solvents, e.g., tetrahydrofuran, glyme, p-dioxane, acetonitrile, and acetone, and in use do not evolve toxic products, and are relatively non-volatile.

The disulfonyl imides when admixed neat (i.e., without a solvent such as p-dioxane) with some cationic sensitive monomers, such as cycloaliphatic epoxide and aromatic glycidyl ether resins, surprisingly produce room temperature stable, latent compositions which are curable upon heating at elevated temperatures, e.g., 100°–140° C.

Where a latent catalyst for curing cationic sensitive monomers is desired or necessary, the disulfonyl imides of formula I also can be used according to this invention in their salt form, such salts preferably having the formula $$[(R_fSO_2)_2N^-]_nM^{n+} \quad \text{(II)}$$

where $R_f$ is as defined above, M is a cation, said cation typically being an ammonium cation (or substituted ammonium cation), or a mono- or polyvalent metal cation of a metal such as a metal selected from the group consisting of metals of Groups I to V and VIII, Subgroups VI-B and VII-B, and those of the lanthanide and actinide series of the Periodic Table; and $n$ in an integer of 1 to 3 and equal to the valence of said cation M.

The amino and ammonium salts can be formed by neutralization of the disulfonyl imides with a salt-forming primary, secondary, or tertiary amine, ammonia, or a quaternary ammonium hydroxide. The salt-forming amines include alkyl amines such as methylamine, ethylamine, dimethylamine, diisopropylamine, trimethylamine, triethylamine, triisopropylamine, triisobutylamine, cyclohexylamine, ethylenediamine, an the like; heterocyclic amines such as morpholine, pyridine, piperidine, and the like; guanidine; aromatic amines such as aniline, and the like; and quaternary ammonium hydroxides such as tetramethylammonium hydroxide, tetraethylammonium hydroxide, benzyltrimethylammonium hydroxide, and the like.

Representative of the metal cations of such metal salts are those of the metals lithium, sodium, potassium, magnesium, calcium, strontium, barium, yttrium, vanadium, manganese, cobalt, nickel, copper, silver, zinc, cadmium, mercury, lead, bismuth, lanthanum, neodymium, and gadolinium. The salts of the metals of Groups III, IV, V, and VIII and Subgroups IB, IIB, VIB, and VIIB are preferred. (The Periodic Table referred to herein is that shown on pp. 448–449 of the Handbook of Chemistry & Physics, 34th ed (1961–1962), published by Chem. Rubber Pub. Co., Cleveland, Oh.)

When the disulfonyl imide salts are activated or delatentized by heating them in admixture with the cationic sensitive monomer, the disulfonyl imide is probably liberated in its free acid form (formula I), making it available for curing.

The term "latent catalyst" as used herein means a catalyst which does not exhibit or manifest any substantial curing or catalytic effect on monomer admixed therewith during normal storage or handling of such mixtures until the mixture is subjected to heat for the purpose of "de-latentizing", though some small or otherwise tolerable or insignificant curing of the monomer may take place before activation, as evidenced by a slight increase in viscosity. Similarly, a composition which has latency or is characterized as being latently curable is one which during the period prior to being heated, to effect cure, exhibits little if any gelling, polymerization, etc., though some small or otherwise tolerable or insignificant curing may take place during such period.

The monomers that can be cured or polymerized with the catalyst of this invention, using the latter in a catalytic amount, are those known to undergo cationic polymerization and include 1,2- and 1,3- epoxides and tetrahydrofuran, vinyl ethers, N-vinyl compounds, aziridines, vinyl aromatics and acetals, which can be homopolymerized or copolymerized. An extensive list of cationic monomers which can be used in this invention is given in U.S. Pats. Nos. 3,347,676 and 3,842,019.

The epoxy resins which can be polymerized in accordance with this invention include epoxy compounds and epoxides of the polymeric type and they can be aliphatic, cycloaliphatic, aromatic or heterocyclic and will typically have an epoxy equivalency (i.e., the number of epoxy groups contained in the average molecule) of from 1.0 to 6.0, preferably 1 to 3, this value being the number average molecular weight of the epoxide divided by the epoxide equivalent weight. Such epoxide monomers are well known — see "Handbook of Epoxy Resins," by Lee and Neville, NcGraw-Hill Book Co., New York (1967) and "Epoxy Resin Technology," by P. F. Bruins, John Wiley & Sons, Inc., New York (1968).

Particularly useful epoxides which can be used in this invention are those which contain one or more cyclohexene oxide groups such as the epoxycyclohexanecarboxylates, typified by 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, and bis(3,4-epoxy-6-methylcyclohexylmethyl) adipate. For a more detailed list of useful epoxides of this nature, reference is made to U.S. Pat. No. 3,117,099.

Representative vinyl aromatics which can be polymerized in this invention include styrene, divinylbenzene, α-methylstyrene, 4-vinylanisole and the like, those having up to 13 carbon atoms being preferred.

Another useful class of the cationic sensitive monomers polymerized in this invention can be represented by the general formula $CH_2=C(Y)XR$, where X is —O— or —NR'—(where R' is hydrogen or lower alkyl), R is hydrocarbyl, halohydrocarbyl, or hydroxyhydrocarbyl when X is oxygen, or R is hydrocarbyl or hydrocarbylsulfonyl when X is nitrogen, and Y is hydrogen, alkyl, aryl, or other hydrocarbyl, or R (as hydrocarbyl) and R can be connected to form a 5 or 6-membered cyclic structure containing nitrogen as a hetero ring atom. The term "hydrocarbyl" is used herein in its usual sense to mean alkyl, alkenyl, aryl, cycloalkyl, cycloalkenyl, alkaryl, arylalkyl, and the like. In general, monomers of this type contain a vinyl group and are typified by vinyl alkyl ethers, such as vinyl methyl ether, vinyl ethyl ether, vinyl n-butyl ether, vinyl 2-chloroethyl ether, vinyl isobutyl ether, vinyl phenyl ether and vinyl 2-ethylhexyl ether, vinyl ethers of substituted aliphatic alcohols such as ω-hydroxybutyl vinyl ether, and N-vinyl compounds such as N-vinyl-N-methyl octanesulfonamide and N-vinylpyrrolidone. A description of vinyl monomers and their use in preparing polymers is set forth in "Vinyl and Related Polymers," by Schildknecht, published by John Wiley & Sons, Inc., New York (1952).

There is a host of commercially available cationic sensitive monomers which can be used in this invention. In particular, epoxides which are readily available include propylene oxide, oxetane, epichlorohydrin, tetrahydrofuran, styrene oxide, vinylcyclohexene oxide, glycidol, glycidyl methacrylate, octylene oxide, phenyl glycidyl ether, 1,2-butane oxide, diglycidyl ether of bisphenol A (e.g., "Epon 828" and "DER 331"), vinylcyclohexene dioxide (e.g., "ERL-4206"), 3,4-epoxycyclohexylmethyl-3,4-epoxycyclohexanecarboxylate (e.g., "ERL-4221"), 3,4-epoxy-6-methylcyclohexylmethyl-3,4-epoxy-6-methylcyclohexanecarboxylate (e.g., "ERL-4201"), bis (3,4-epoxy-6-methylcyclohexylmethyl)adipate (e.g., "ERL-4289"), aliphatic epoxy modified with polypropylene glycol (e.g., "ERL-4050" and "ERL-4052"), dipentene dioxide (e.g., "ERL-4269"), epoxidized polybutadiene (e.g., "oxiron 2001"), silicone epoxy (e.g., "Syl-Kem 90"), 1,4-butanediol diglycidyl ether (e.g., "Araldite RD-2"), polyglycidyl ether of phenolformaldehyde novolak (e.g., "DEN-431", "Epi-Rez 521" and "DEN-438"), resorcinol diglycidyl ether (e.g., "Kopoxite"), polyglycol diepoxide (e.g., "DER 736"), and polyacrylate epoxide (e.g., "Epocryl U-14"), urethane modified epoxide (e.g., "QX3599"), polyfunctional flexible epoxides (e.g., "Flexibilizer 151"), and mixtures thereof as well as mixtures thereof with co-curatives, curing agents, or hardeners which also are well-known (see Lee and Neville and Bruins, supra). Representative of the co-curatives or hardeners which can be used are acid anhydrides such a nadic methyl anhydride, cyclopentanetetracarboxylic dianhydride, methendic anhydride, cis-1,2-cyclohexanedicarboxylic anhydride, and mixtures thereof.

In general, the polymerization can be carried out in accordance with this invention at room temperature (or as low as 0° C in some cases) in the case of the non-latent catalysts, though elevated temperatures, e.g., 30° to 200° C, preferably 50° to 100° C, can be used to accelerate the cure. In the case of latent catalysts, temperatures generally in the range of 50° to 250° C, preferably from 80° to 150° C, can be used. The particular amount of catalyst to be used and temperature of polymerization will vary, of course, and be dependent on the particular monomers used and the particular catalyst used, as well as the particular application to be made. Polymerization can be effected in the absence of halide promoter, photo-reducible ketone, or without requiring actinic light.

Generally, the amount of disulfonyl imide or salt thereof to be used as a catalyst in this invention will be in the range of 0.01 to 20 weight percent, preferably 0.1 to 5 weight percent, based on the weight of cationic monomeric material.

As mentioned above, the disulfonyl imides have high solubility in common solvents as well as in a wide variety of polymerizable monomers, which property makes it convenient to mix the catalyst with the monomers to obtain a homogeneous mixture. Solvents which can be used for the polymerization representatively include polar solvents such as acetone, tetrahydrofuran, glyme (ethyleneglycol dimethyl ether), acetonitrile, and p-dioxane. In some cases, it will be desirable to mix the cationic sensitive monomer with a solution of the disulfonyl imide. When tetrahydrofuran is used as a solvent, immediate use of the catalyst solution is preferred because polymerization of the tetrahydrofuran occurs after storage, e.g., greater than 2 hours, at room temperature. In such cases with tetrahydrofuran, copolymerization can occur.

Tetrahydrofuran is known to undergo homopolymerization slowly compared to the 1,2-epoxides and many known acid catalysts result in low conversion of the monomer and the products are usually low molecular weight oils. The disulfonyl imides of this invention afford high monomer conversion and the product is a high molecular weight solid polymer.

The compositions of this invention, comprising the cationic monomer(s) and catalyst, can be used for applications like those cationic monomer systems cured with other catalysts, such as epoxides cured with $BF_3$ or $BF_3 \cdot O(C_2H_5)_2$. For example, the compositions of this invention can be used as adhesives, caulking and sealing compounds, casting and molding compounds, potting and encapsulating compounds, impregnating and coating compounds, etc., depending on the particular monomers and/or catalyst used. Where the catalyst is used in its latent form, the curable composition can be used as a one-component or cured-in-place system, such capability enhancing its use for the applications mentioned above. One particular application where such capability can be capitalized on is in the electrical area, where such latently curable composition can be used to coat or impregnate for insulation or protective purposes electrical motor windings or coils, transformers, capacitors electrical terminals, cables, and other electrical devices.

The curable epoxy composition of this invention can be used to make shaped articles of self-supporting, structural, filled or reinforced epoxy resin composites, such as glass fiber cloth reinforced epoxy resin composites, useful, for example, as repair materials. The various filler and reinforcements and other particulate materials to be mixed or coated with or dispersed in the curable compositions of this invention to make the composites of this invention, as well as methods of processing these materials in making the composites, and their applications, are those known to the art. In this connection, reference is made to "Modern Composite Materials," edited by Brautman and Krock, published by Addison-Wesley Publishing Company, Reading, Mass. (1967); and "Handbook of Fiberglass and Advances Plastics Composites," edited by G. Lubin, published by Van Nostrand Reinhold Company (1969).

The object and advantages of this invention are further illustrated by the following examples, but the particular materials and amounts thereof recited in these examples as well as other conditions and details should not be construed to unduly limit this invention.

EXAMPLE 1

A mixture of 29.5 g (0.1 mol) dry $C_4F_9SO_2NHNa$ (prepared by reacting $C_4F_9SO_2NH_2$ with sodium in methanol) and 40 ml hexamethyldisilazane was stirred under reflux (under nitrogen) for 3 hr. and excess disilazane removed by distillation. A mixture of the residue, 80 ml anhydrous p-dioxane, and 20 g (0.13 mol) $CF_3SO_2F$ was heated in a pressure vessel at 100° C for 16 hr. The solvent was removed from the product by distillation giving 39 g dry sodium salt residue containing $C_4F_9SO_2N(Na)SO_2CF_3$. The sodium salt (32 g) was dissolved in acetic acid, the acetic acid removed by distillation and the residue stirred with anhydrous diethyl ether. Filtration followed by evaporation of the filtrate under reduced pressure gave 14.5 g residue which was subjected to sublimation at 110° C in vacuo to remove $C_4F_9SO_2NH_2$. The sublimation residue was mixed with 20 ml concentrated sulfuric acid and the mixture distilled giving 5.1 g $C_4F_9SO_2NHSO_2CF_3$, bp. 80° C (2.0 mm), which is a solid at room temperature, and was found to contain straight chain and branched $C_4F_9$ groups by fluorine nuclear magnetic resonance analysis.

EXAMPLE 2

A solution of 0.08 g $C_4F_9SO_2NHSO_2CF_3$ and 0.35 g p-dioxane was mixed with 6 g 3,4-epoxycyclohexylmethyl-3,4-epoxycyclohexanecarboxylate (ERL 4221) at room temperature. An exothermic polymerization to a hard brittle solid occurred within 15 sec.

EXAMPLE 3

A solution of 0.05 g $C_4F_9SO_2NHSO_2CF_3$ and 0.15 g tetrahydrofuran was mixed with 4 g ERL 4221. An exothermic polymerization occurred within 10 sec. giving a hard polymer.

EXAMPLE 4

$C_4F_9SO_2NHSO_2CF_3$(0.05 g) was mixed with 4 g methylene chloride and one drop of diethyl ether added to give a clear solution. The solution was mixed with 5 g ERL 4221. Although some gelation occurred, the mixture after 24 hrs. remained as solid particles dispersed in liquid ERL 4221. After heating at 100° C for 5 min, polymerization to a brittle solid occurred.

EXAMPLE 5

The silver salt, $C_4F_9SO_2NAgSO_2CF_3$, was prepared by neutralization of 0.4 g $C_4F_9SO_2NHSO_2CF_3$ with silver carbonate in methanol. Filtration followed by evaporation of the filtrate gave 0.37 g of the silver salt (azeotropically dried with benzene in vacuo).

A mixture of 0.02 g of the above silver salt and 2.0 g ERL 4221 was kept at room temperature for 4 hr. (with no discernible increase in viscosity or gelation) and then heated at 140° C for 5 min, giving a non-tacky polymer.

EXAMPLE 6

The morpholine salt of $C_4F_9SO_2NHSO_2CF_3$ was prepared by neutralization of 0.6 g of the free acid precursor with morpholine in diethyl ether. The ether was allowed to evaporate and the residue washed with heptane and then with hot benzene. Filtration (at 25° C) gave 0.35 g of the morpholine salt.

A mixture of 0.04 g of the morpholine salt and 3.5 g ERL 4221 was latent at room temperature but when heated at 140° C for 3 min, a hard, tack-free polymer was obtained.

EXAMPLE 7

A solution of 0.08 g $C_4F_9SO_2NHSO_2CF_3$ and 0.18 g p-dioxane was rapidly mixed at room temperature with 8 g of a mixture of 80 parts by weight DER 331 (diglycidylether of bisphenol A) and 20 parts by weight EPOTUF 37-123 flexibilizer. Heat was generated during mixing and after 3 days a paste was obtained. Upon heating of the paste at 140° C for 1 hr., polymerization to a clear, tack-free solid occurred.

In a similar manner, a mixture of 0.07 g $C_4F_9SO_2NHSO_2CF_3$, 0.14 g p-dioxane and 7 g DER 331 was heated at 140° C for about 2 hr., giving a tack-free polymer.

EXAMPLE 8

A solution of 0.04 g $C_4F_9SO_2NHSO_2CF_3$ and 0.15 g p-dioxane was mixed with 2 g phenyl glycidyl ether at room temperature. There was no significant polymerization after 3 days. After heating at 130°–140° C for 1.5 hr., a high viscosity oil was obtained.

EXAMPLE 9

A solution of 0.01 g $C_4F_9SO_2NHSO_2CF_3$ and 0.06 g acetone was added to 2 g vinylcyclohexene dioxide at room temperature. Immediate gelation and exothermic polymerization resulted.

EXAMPLE 10

A solution of 0.02 g $C_4F_9SO_2NHSO_2CF_3$ in 0.05 g p-dioxane was added to 2 g styrene oxide at room temperature. An immediate polymerization occurred to give a very viscous oil.

EXAMPLE 11

A catalyst solution of 0.14 g $C_4F_9SO_2NHSO_2CF_3$ and 0.49 g p-dioxane was prepared. Addition of 0.06 g of this catalyst solution to 1.0 g vinyl isopropyl ether caused an immediate exotherm and polymerization. Addition at room temperature of 0.05 g the catalyst solution to 2.0 g vinyl oleyl ether also gave an immediate exotherm and polymerization to a dark viscous oil. Addition of 0.14 g of the above catalyst solution to 2 g N-methyl,N-vinyl octanesulfonamide caused an immediate exotherm and polymerization to a very viscous oil.

EXAMPLE 12

A solution of 0.045 g $C_4F_9SO_2NHSO_2CF_3$ and 4.5 g high purity commercial tetrahydrofuran was prepared and kept at ambient temperature in a closed glass vial. After 16 hr., a light yellow grease was obtained. 3.2 g of the grease was allowed to remain at room temperature for 7 days and then kept at room temperature in vacuo (2 hr.) to remove any volatile components. The residue (2.4 g) was a tough, high molecular weight rubbery polymer.

Example 13

A catalyst solution of 0.005 g $C_4F_9SO_2NHSO_2CF_3$ and 0.015 g p-dioxane was mixed with 1 g of styrene at ambient temperature. After one min the solution became warm and after 5 min a tacky, solid polymer was obtained.

In a similar manner, divinylbenzene mixed with said catalyst solution polymerized within one minute giving a dark blue, hard solid polymer.

Various modifications and alterations of this invention will become apparent to those skilled in the art without departing from the scope and spirit of this invention, and it should be understood that this invention is not to be unduly limited to the illustrative embodiment set forth herein.

I claim:

1. The process comprising the steps of mixing monomer selected from the group consisting of epoxy compound or resin, vinyl ether, N-vinyl compound, aziridine, vinyl aromatic and acetal with a bis(fluoroaliphaticsulfonyl)imide or salt thereof as a catalyst for polymerization thereof, and polymerizing said monomer.

2. The process of claim 1 wherein said catalyst has the formula $(R_fSO_2)_2NH$ where $R_f$ is a fluorinated saturated aliphatic radical.

3. The process of claim 1, wherein said catalyst has the formula $[(R_fSO_2)_2N^-]_nM^{n+}$ where $R_f$ is a fluorinated saturated aliphatic radical, M is an ammonium or metal cation, and $n$ is the valence of said cation.

4. The process according to claim 1, wherein said catalyst is mixed with said monomer in the form of a solution and polymerization is effected by heating.

5. The process according to claim 1 wherein said monomer comprises 3,4-epoxycyclohexylmethyl-3,4-epoxycyclohexanecarboxylate.

6. The process according to claim 1 wherein said monomer comprises diglycidyl ether of bisphenol A.

7. The process according to claim 1 wherein said monomer comprises phenyl glycidyl ether.

8. The process according to claim 1 wherein said monomer comprises vinylcyclohexene dioxide.

9. The process according to claim 1 wherein said monomer comprises styrene oxide.

10. The process according to claim 1 wherein said monomer comprises isopropyl vinyl ether.

11. The process according to claim 1 wherein said monomer comprises oleyl vinyl ether.

12. The process according to claim 1 wherein said monomer comprises N-methyl, N-vinyloctane sulfonamide.

13. The process according to claim 1 wherein said monomer comprises styrene.

14. The process according to claim 1 wherein said monomer comprises divinylbenzene.

15. The process comprising the steps of mixing tetrahydrofuran with a bis(fluoroaliphaticsulfonyl)imide or salt thereof as a catalyst for polymerization thereof, and polymerizing said tetrahydrofuran.

16. The process of claim 1 wherein said catalyst is $CF_3SO_2NHSO_2C_4F_9$.

17. The process of claim 1 wherein said catalyst is the morpholine salt of $CF_3SO_2NHSO_2C_4F_9$.

18. The process of claim 1 wherein said catalyst is the silver salt of $CF_3SO_2NHSO_2C_4F_9$.

19. A latently curable composition comprising monomer selected from the group consisting of epoxy compound or resin, vinyl ether, N-vinyl compound, aziridine, vinyl aromatic and acetal and, as a catalyst for the polymerization thereof, a bis(fluoroaliphaticsulfonyl)imide or an ammonium or metal salt thereof.

20. The process according to claim 1 wherein said monomer comprises an epoxy compound or resin containing one or more cyclohexene oxide groups.

21. The process according to claim 1 wherein said monomer comprises an epoxy compound or resin having an epoxy equivalency of from 1.0 to 6.0.

22. The process according to claim 1 wherein said monomer comprises an epoxy compound or resin having an epoxy equivalency of from 1 to 3.

* * * * *